Patented Mar. 28, 1939

2,152,292

UNITED STATES PATENT OFFICE 2,152,292

PROCESS FOR THE PRODUCTION OF ALKYL ESTER SALTS

Adrianus Johannes van Peski and Anton Johan Tulleners, Amsterdam, Netherlands, assignors to Shell Development Company, San Francisco, Calif., a corporation of Delaware No Drawing. Application June 24, 1935, Serial No. 28,215. In the Netherlands July 3, 1934

4 Claims. (Cl. 260—460)

This invention relates to the production of salts of alkyl esters of polybasic acids and is particularly concerned with the production of such salts from the reaction products of olefines with polybasic acids.

We have found that alkyl ester salts of excellent properties are obtained when hydrocarbon material containing at least 10% paraffin wax is selected as initial material for manufacturing by heat treatment the olefines to be reacted with the polybasic acids. It was further ascertained that the higher the paraffin wax content of the initial material, the better the final products, provided that the composition of the remaining part of the initial material remains substantially the same. Thus material containing at least 50% paraffin wax is, as a rule, preferred to material containing about 20% paraffin wax, whilst excellent alkyl ester salts result from the selection of pure or substantially pure paraffin wax, or other material of very high paraffin wax content, as initial material.

According to the invention such mineral oils or tar oils, e. g. brown-coal tar oils, may be used as are rich in paraffin wax as well as their wax-containing distillates or residues. Petrolatum, ozokerite wax, slop-wax, filterpress cakes or other hydrocarbon waxes or materials substantially consisting of paraffin wax are found to be excellent initial materials for producing by heat treatment the unsaturated hydrocarbons to be reacted with the polybasic acids.

The heat treatment to be applied to the waxy material may comprise a cracking treatment, preferably in the vapor phase, or the initial material may first be cracked in the liquid phase and subsequently in the vapor phase. The material may also be subjected to a pure dehydrogenation treatment or both to a cracking and a dehydrogenation treatment.

In all these cases suitable cracking or dehydrogenation catalysts may be applied, if desired. In these various ways liquid cracked products may be obtained the olefine content of which may amount up to nearly 100%, for example 90 or 95%, the remainder being substantially saturated hydrocarbons. If desired, the initial material or the unsaturated products obtained therefrom by the heat treatment may be subjected to a suitable pretreatment. Thus the paraffin wax content of the initial material may be enriched by a treatment with selective solvents for the aromatics, or the unsaturated products obtained in the heat treatment of the initial material may be treated with small amounts of $H_2SO_4$ or $AlCl_3$, to remove certain highly unsaturated compounds, such as di-olefines with conjugated double bonds.

The unsaturated products obtained in the heat treatment of the waxy initial material may be reacted with the strong polybasic acids as a whole, but it is preferred to fractionate these unsaturated products into various fractions and to react liquid fractions, such as the $C_6$—$C_9$, the $C_9$—$C_{12}$ and the $C_{13}$—$C_{18}$ fractions, separately with the strong polybasic acids.

Suitable acids which may be used as reaction media for olefines in the preparation of the acid alkyl esters to which our invention is applicable, are polybasic mineral-acting acids of which sulfuric, pyrosulfuric, phosphoric, pyrophosphoric, and the like are typical. The concentrations in which such acids are customarily used for the absorption of olefines vary widely depending upon the character of the olefine or olefines involved, the olefinic concentration, and the temperature at which the absorption is carried out. In the practice of our invention we preferably adjust the conditions of olefine absorption, in the conventional manner, so that substantially only absorption of the olefines is effected, and tar formation and other undesirable side reactions are reduced to a minimum. The resulting "acid liquor" usually comprises an aqueous solution of neutral and/or acid esters with some free mineral-acting acid and may or may not contain small amounts of polymer, free alcohol and/or very low percentages of free hydrocarbons.

Operating as well as economic advantages result from the removal of free acid from the olefine absorption product prior to formation of the desired salt. This may be effected in several ways. Advantage may be taken of the process described in copending application, Serial No. 27,048 filed June 17, 1935 by Tulleners, whereby the acid is selectively removed in a free state by extraction with a small quantity of water, for example. Besides the absence of sulfate in the final product, this procedure also provides the possibility of economic regeneration of the excess acid. Furthermore, the coloring constituents present in the absorption product are removed in the aqueous layer simultaneously with the free acid with the result that a finished product of much improved appearance is obtained.

Alternatively, the free acid present in the olefine absorption product may be removed by selective neutralization, as by treatment with an alkaline agent such as Glauber's salt, preferably after the addition of water or ice. The sodium bisulfate formed separates as an aqueous layer which may be drawn off from the layer containing the alkyl esters. This procedure prevents the final product being adulterated with sulfate to any appreciable extent.

The separation of the phases in this method of procedure may be facilitated by the addition of a small quantity of a substance which alters the interfacial tension, such as ethyl ether, amyl alcohol, and the like.

To insure the absence of neutral alkyl esters in the finished product several alternative procedures may be employed. For example, the solution containing neutral alkyl esters and salts of acid alkyl esters may be extracted with suitable selective solvents for the former such as benzene, gasoline fractions, saturated hydrocarbons as pentane, hexane, etc., their admixtures, and the like. This extraction may be carried out in either the presence or absence of free acid. Another effective method of procedure comprises dilution of the, preferably acid-free, olefine absorption product with a relatively large amount of water whereby two phases will be formed. The phase containing the neutral esters and any polymers present may be drawn off and the aqueous phase containing substantially only acid alkyl esters may then be used to prepare the desired salt by any of the described methods. This separation of phases can conveniently be effected by dilution with a solution of a basic compound of the metal from which the alkyl ester salt is to be prepared. In this manner reaction as well as solution takes place, so two phases are formed with one phase containing a solution of a metallo alkyl ester. In these ways of operating, the product is freed of the polymers which accumulate in the phase with the neutral alkyl esters.

The neutral alkyl esters, so separated from the olefine absorption product, may be converted into alkyl ester salts by treatment with an alkaline agent at an elevated temperature. This procedure offers special advantages wherever it may be more desirable to make use of the acid alkyl esters for the preparation of other products, such as alcohols, and the like. When it is not so desired to prepare a different product or products from the acid alkyl esters the conversion of the neutral esters into alkyl ester salts may advantageously be effected without separation of the two types of esters. Thus the olefine absorption product, preferably after being freed of its excess acid, if present, may be treated with a solution of a basic compound of the metal from which the alkyl ester salt is to be prepared. The base is added in sufficient amount to effect decomposition of the neutral alkyl esters present and the mixture is heated until their decomposition is substantially complete. The recovery and purification of the alkyl ester salts formed from both neutral and acid alkyl esters may then be carried out in any of the ways which have been described. By this method of operation, not only is an injurious component (neutral esters) of the final product eliminated, but also the yield of the desired alkyl acid salt is increased.

The following examples illustrate specific applications of our invention to the production of sodium salts of alkyl sulfuric acid esters, but the same procedures may be used to prepare any other desired salt and/or salts of other alkyl acid esters.

Example I 12.7 kgs. of 90% sulfuric acid were added to 20 kgs. of a cracked benzine fraction of boiling temperature range of about 160° to 220° C. The benzine fraction was obtained by vapor phase cracking of paraffin cakes and had a bromine value, according to McIlhiney, of 94. The acid addition was carried out slowly while thoroughly cooling and stirring the mixture for about one and a half hours so that a temperature of about 5° to 10° C. was maintained therein.

The absorption product obtained was poured on to 3.3 kgs. of ice which caused the temperature to rise to about 25° C. After standing about fifteen minutes a division into two layers took place in the mixture. These layers were separated. The lower layer was found to be about a 62% sulfuric acid solution containing much of the coloring matter which had been present in the absorption product.

The upper layer was neutralized with a 40% sodium hydroxide solution of which about 3.14 liters were required. Any excessive rise in temperature during neutralization was avoided by cooling. The dialkyl sulfate content of the neutral product was determined by analysis and it was found that 1.6 liters of the 40% sodium hydroxide solution would be required to effect its saponification. This amount of alkali was then added and the solution was heated to a temperature of about 95° C. and maintained at that temperature for about three hours. The product of the reaction was diluted with about 20 liters of water and again heated at 95° C. for some time. Two phases were formed in this operation. After heating these phases were allowed to stratify and the upper phase (3.12 kgs.) comprising products of polymerization, alcohols, etc. was separated from the lower layer which was a clear solution of sodium alkyl sulfates. This solution could be further diluted with water without becoming cloudy and on evaporation under vacuum yielded 19 kgs. of air-dried product.

Examples II

A crack distillate fraction boiling between 220° and 300° C. obtained by cracking crude paraffin cakes in the vapor phase at 560° C., substantially containing alkenes with 13 to 18 C-atoms, with a bromine number McIlhiney=50.5, corresponding to a percentage of alkenes of approximately 68, and a molecular quantity of 90% sulfuric acid, are intensively mixed in a reaction vessel. The reaction vessel is kept at a temperature of 25° C. by cooling, the time of reaction being about 1 hour. After this about 10% by weight of water is added to the mixture, whilst the temperature is kept at 25° C. The mixture is then introduced into a separator, in which two layers are formed, the lower consisting of an approximate 56% $H_2SO_4$ solution and the upper layer of acid and neutral alkyl sulfates, polymerization products and unconverted base material. The said upper layer is introduced, simultaneously with an excess of lye, while intensively stirring, into a reaction vessel, which is kept at about 100° C. The time of reaction is about 6 hours. In the reaction vessel the neutralization of the alkyl acid ester as well as the saponification of the neutral alkyl ester takes place. Care is taken that an alkaline reaction prevails throughout the reaction vessel, the final product yet showing as slight an alkaline character as possible. The alkyl acid ester salt in an alkaline medium being resistant against heating, there is no risk of a decomposition of this salt. The reaction mixture obtained is mixed with an equal quantity of water and introduced into a separator, where the mixture is separated into an upper layer insoluble in water and an aqueous solution of sodium alkyl sulfate. The separator is thereby likewise kept at 100° C. The sodium alkyl sulfate may be obtained as a dry powder, e. g. by using a spraying and drying apparatus. The yield of sodium alkyl sulfate, calculated on the quantity of olefines present in the initial material, amounts to about 59% of the theoretical yield. The process is carried out continuously.

The salts of the alkyl esters of polybasic mineral-acting acids which may be prepared by our invention may be used, individually or as mixtures, with or without other agents, for a great many widely different purposes. They have exceptional wetting and emulsifying power. They may be used for the production of preparations for treating textiles, for greasing leather, as levelling agents in the dyeing of materials of all kind, as flotation agents, in the preparation of finely divided pigments, spray oils, aqueous dispersions of water-insoluble substances like paraffin, tar, asphalt, etc., and the like. They may also serve as intermediates in the synthesis of other valuable organic compounds such as alkyl cyanides, thio-ethers, etc. When reacted with salts of fatty acids, they furnish esters and may also be used for the preparation of pure alcohols. For the latter purpose they may be dissolved, for example, in water, and yield alcohols after acidification and heating.

While we have in the foregoing described in some detail the preferred embodiments of our invention and some variants thereof, it will be understood that this is only for the purpose of making the invention more clear and that the invention is not to be regarded as limited to the details of operation described, nor is it dependent upon the soundness or accuracy of the theories which we have advanced as to the advantageous results attained. On the other hand, the invention is to be regarded as limited only by the terms of the accompanying claims, in which it is our intention to claim all novelty inherent therein as broadly as is possible in view of the prior art.

We claim as our invention:

1. Process for preparing wetting agents and detergents comprising cracking a paraffinic petroleum fraction selected from the group consisting of petrolatum and paraffin wax first in the liquid phase and subsequently in the vapor phase to provide a cracked fraction containing a mixture of olefines having more than six carbon atoms per molecule, reacting said mixture of olefines with a strong inorganic polybasic acid and neutralizing the resulting mixture of alkyl acid derivatives of said acid.

2. Process for preparing wetting agents and detergents comprising cracking a paraffinic petroleum fraction selected from the group consisting of petrolatum and paraffin wax first in the liquid phase and subsequently in the vapor phase to provide a cracked fraction containing a mixture of olefines having more than six carbon atoms per molecule, reacting said mixture of olefines with sulfuric acid to remove the more reactive unsaturated components, treating the remaining substantially normal olefines with a strong inorganic polybasic acid and neutralizing the resulting mixture of alkyl acid derivatives of said acid.

3. Process for preparing wetting agents and detergents comprising cracking a paraffinic petroleum fraction selected from the group consisting of petrolatum and paraffin wax to provide a cracked fraction containing a mixture of olefines having more than six carbon atoms per molecule, reacting said mixture of olefines with sulfuric acid to selectively remove unsaturated components more reactive than the normal olefines present, reacting the remaining substantially normal olefines with a strong inorganic polybasic acid and neutralizing the resulting mixture of alkyl acid derivatives of said acid.

4. Process for preparing wetting agents and detergents comprising cracking a paraffinic petroleum fraction selected from the group consisting of petrolatum and paraffin wax to provide a cracked fraction containing a mixture of olefines having more than six carbon atoms per molecule, substantially selectively removing at least a part of the unsaturated compounds more reactive than the normal olefines contained in said fraction, reacting the remaining substantially normal olefines with sulfuric acid and neutralizing the resulting mixture of alkyl acid sulfate derivatives.

ADRIANUS JOHANNES VAN PESKI.
ANTON JOHAN TULLENERS.